No. 644,034.  
Patented Feb. 20, 1900.
G. F. SCHULER & M. GRANAT.
ACETYLENE GENERATOR.
(Application filed June 13, 1899.)
(No Model.)
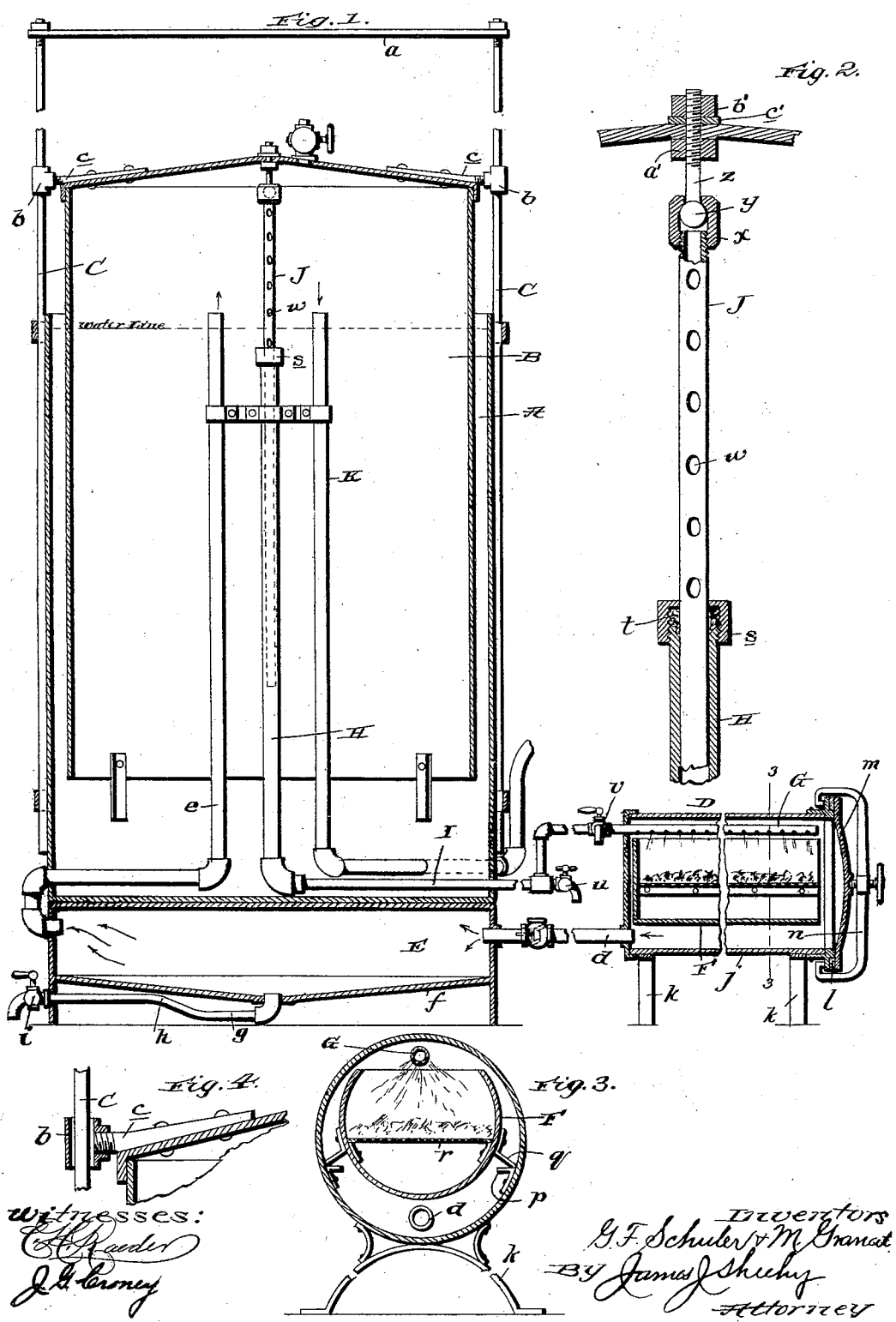
Witnesses:  
E. A. Raeder  
J. G. Croney
Inventors  
G. F. Schuler & M. Granat  
By James J. Sheehy  
Attorney

UNITED STATES PATENT OFFICE.

GEORGE F. SCHULER AND MAYER GRANAT, OF STOCKTON, CALIFORNIA; SAID GRANAT ASSIGNOR TO SAID SCHULER.

ACETYLENE-GENERATOR.

SPECIFICATION forming part of Letters Patent No. 644,034, dated February 20, 1900.

Application filed June 13, 1899. Serial No. 720,387. (No model.)

*To all whom it may concern:*

Be it known that we, GEORGE F. SCHULER and MAYER GRANAT, citizens of the United States, residing at Stockton, in the county of San Joaquin and State of California, have invented new and useful Improvements in Apparatus for Making Acetylene Gas, of which the following is a specification.

Our invention relates to apparatus for making acetylene gas; and it consists in the peculiar construction, certain novel combinations, and the adaptation of parts hereinafter described, and particularly pointed out in the claims appended.

In the accompanying drawings, Figure 1 is a vertical section of our improved apparatus. Fig. 2 is an enlarged detail section illustrative of the means for controlling the supply of water to the generator. Fig. 3 is a transverse section of the generator, taken in the plane indicated by line 3 3 of Fig. 1. Fig. 4 is an enlarged detail section illustrating a portion of the gas-receiver, together with one of the guide-rods and the eye receiving the same.

In the said drawings similar letters designate corresponding parts in all of the several views.

A is an upright tank designed to be filled in any suitable manner with water.

B is a vertically-movable gas-receiver, the lower end of which is arranged in and sealed by the water in the tank, and C are upright rods fixed to the tank at opposite points and extending above the same, where they are connected by a cross-bar $a$. The said rods pass loosely through T's $b$, screwed on the outer ends of flattened pipes $c$, fixed on the top of the receiver, and have for their purpose to guide the receiver in its movements.

D is a gas-generator, and E is a gas-cooler which is connected by a valved pipe $d$ with the generator and by a pipe $e$ with the interior of the receiver. The cooler is arranged directly below the tank A, and hence it will be seen that the gas while in the cooler will be subject to the cooling action of the water in the tank and will be discharged into the receiver in a cooled state. The water of condensation removed from the gas in cooler E by the cooling action of the water in tank A falls upon the bottom $f$ of the cooler, which is pitched downwardly toward its center, where it is provided with a discharge-pipe $g$. This pipe $g$ is bent as shown to form a trap $h$ for preventing the escape of gas therethrough and is preferably provided at its outer end with a cock $i$.

The casing $j$ of the generator D, which is preferably cylindrical in form and supported by legs $k$, is provided at one end with a gasket $l$ and a head $m$, the latter being removably secured in position by a clamp $n$, as illustrated. Said casing $j$ is also provided with interior ledges $p$, upon which rest supports $q$ at opposite sides of a removable carbid-holder F. This carbid-holder is provided with a removable foraminated support $r$ for the carbid, and its longitudinal center is disposed below a longitudinal spray-pipe G after the manner shown.

H is a tube which is disposed vertically in the tank A and is provided at its upper end, which is arranged below the water-line, with a gland $s$, containing packing $t$.

I is a pipe which connects the lower end of the tube H and the spray-pipe or nozzle G and is preferably provided with cocks $u$ and $v$, as shown, and J is a pipe connected and movable with the receiver and telescoped in the tube H. This pipe J is provided with apertures $w$ at intervals in the upper portion of its length and is designed to control the supply of water to the generator. It will be readily observed that when the receiver is charged with a large volume of gas and is raised thereby to such an extent as to carry the lowermost aperture $w$ in pipe $j$ above the water in tank A the supply of water to the generator will be cut off and the generation of gas stopped. When, however, gas is drawn from the receiver B through the building supply-pipe K and said receiver moves downwardly, the supply of water to the generator and the consequent generation of gas will be reëstablished as soon as the lowermost aperture $w$ in pipe J is submerged and will be continued as the receiver and pipe J descend and until the receiver is again raised by the gas to the extent necessary to carry the lowermost aperture in pipe J above the water in tank A.

For the purpose of preventing the transmission of casual lateral movement of the receiver B and the pipe J, which would cause said pipe to bind in the tube H, we provide a universal joint between the pipe J and the receiver. The said joint is made up of a socket $x$ at the upper end of the pipe J, in which is arranged a ball $y$ at one end of a threaded rod $z$, which extends through the top of the receiver and is connected thereto by lower and upper nuts $a'$ $b'$, between the latter of which and the receiver B is interposed a packing-disk $c'$, as shown, to prevent the escape of gas.

The supply of water to the generator and the generation of gas being controlled by the amount of gas in the receiver, it follows that our improved apparatus requires but a minimum amount of attention. It will also be appreciated that the construction of the casing and the carbid-holder of the generator is such that the said holder may be readily discharged of debris and replenished with calcium carbid whenever necessary. It will be further appreciated that the construction disclosed is simple and inexpensive and embodies no parts such as are likely to get out of order after a short period of use.

Having thus described our invention, what we claim is—

1. In an apparatus for making gas, the combination of a generator, a water-tank, a movable gas-receiver, means for conveying gas from the generator to the receiver, a tube arranged in the tank and connected with the generator and having a packing-box, a pipe telescoped in the said tube and having one or more openings for the passage of water to the tube, and a universal joint connecting said pipe and the receiver, substantially as specified.

2. In an apparatus for making gas, the combination of a generator, an upright water-tank, a vertically-movable gas-receiver, means for conveying gas from the generator to the receiver, an upright tube arranged in the tank and connected with the generator and having a packing-box at its upper end, a pipe telescoped in said tube and having a socket at its upper end and also having one or more openings for the passage of water to the tube, a rod connected to the receiver and having a ball at one end arranged in the socket on the pipe, substantially as specified.

3. In an apparatus for making gas, the combination of a generator, a water-tank, a movable gas-receiver, a cooler arranged directly below the water-tank, a pipe connecting the generator and cooler, a pipe connecting the cooler and the receiver, a tube arranged in the tank and connected with the generator and having a packing-box, a pipe telescoped in the said tube and having one or more openings for the passage of water to the tube, and a universal joint connecting said pipe and the receiver, substantially as specified.

In testimony whereof we have hereunto set our hands in presence of two subscribing witnesses.

GEORGE F. SCHULER.
MAYER GRANAT.

Witnesses:
C. W. NORTON,
I. H. ROBINSON.